United States Patent Office 2,739,352
Patented Mar. 27, 1956

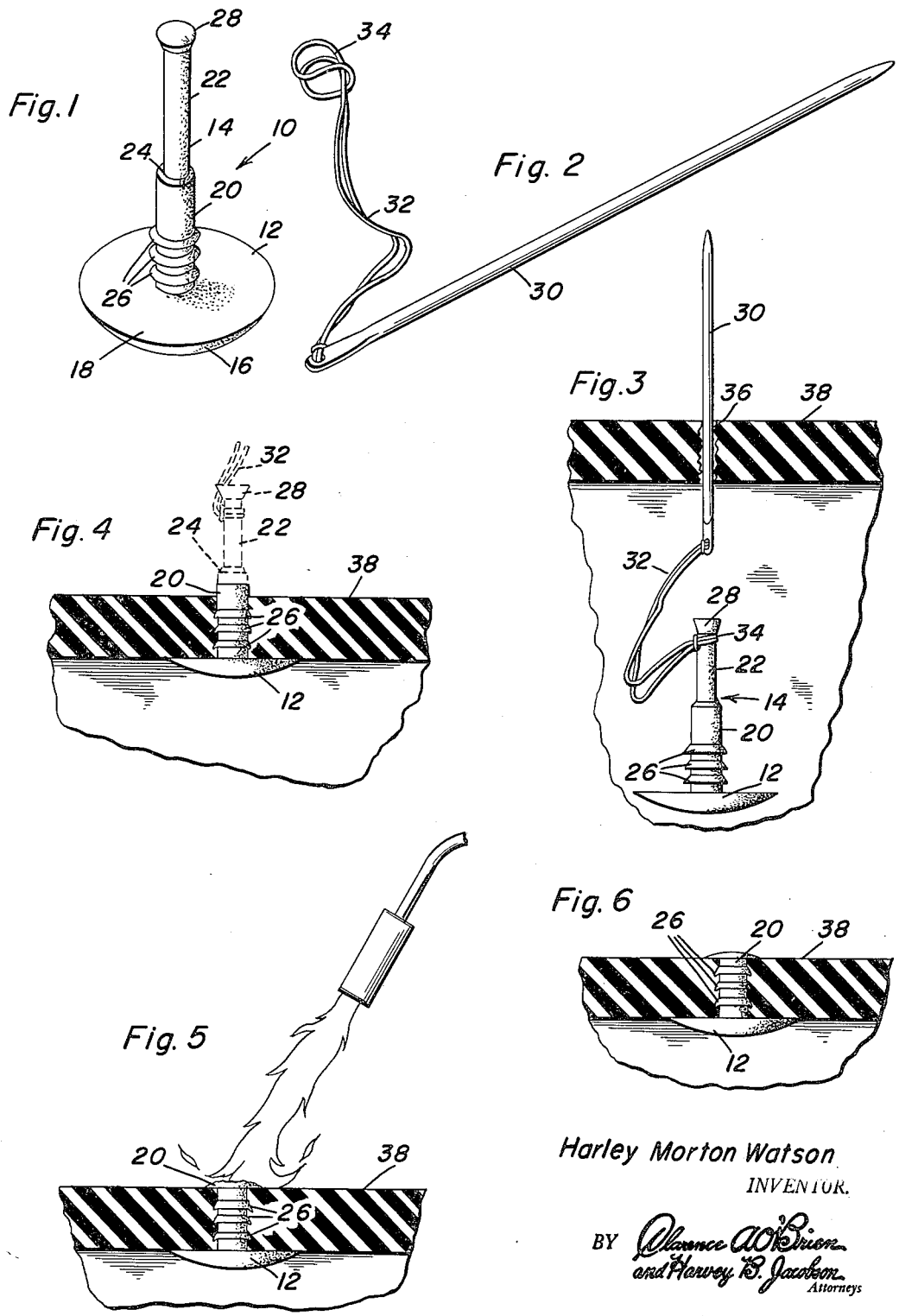

2,739,352
METHOD OF REPAIRING TIRES

Harley Morton Watson, Omaha, Nebr., assignor to The Buxbaum Company, Canton, Ohio, a corporation of Ohio Application April 2, 1954, Serial No. 420,729

1 Claim. (Cl. 18—59)

The present invention relates to a device for repairing tire casings.

The primary object of the invention is to provide a tire plug for a punctured tire casing which will positively seal the puncture in the casing and lock within the casing, which plug will also serve to prevent friction in addition to sealing the puncture as the tire is rotated.

A highly important object of the invention is in the provision of a tire plug including a stem formed entirely of soft, pliable rubber-like material capable of softening to a semi-liquid or doughy consistency upon ignition thereof whereby the same will fuse with and form a permanent part of the tire.

Another important object of the invention is the provision of the tire plug wherein the stem of the plug is provided with radially extending annular fins which are downturned to lock the plug in position in the puncture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the tire plug per se;

Figure 2 is a perspective view of the needle and cord for drawing the stem of the plug through a tire puncture;

Figure 3 is a cross sectional view of a portion of the tire with a needle extending upwardly through the puncture preparatory to pulling the stem of the plug through the puncture;

Figure 4 is a view similar to Figure 3 disclosing the plug in place sealing the puncture;

Figure 5 is a cross sectional view of the tire with the plug in place in the puncture with a portion of the stem of the plug being fused to the tire; and Figure 6 is a view of the plug forming a permanent puncture seal in the tire.

In the drawings, the plug is designated in its entirety by the numeral 10 and is shown to consist of a head 12 and a stem or shank 14.

The material forming the plug is a flexible, pliable rubber which is capable of melting to a semi-liquid condition upon the application of heat thereto without burning to an ash whereby the plug can form a permanent seal for a tire puncture.

The head 12 of the plug consists of a flat, disk-like plate being centrally thickened to present a dome-shaped top surface 16 and a flat undersurface 18. Rising centrally from the head 12 from the undersurface 18 thereof is the stem or shank 14 of the plug, the stem 14 having a relatively large cylindrical lower portion 20 joined integrally to reduced upper end portion 22, the juncture between the lower and upper portions being formed by bevelled shoulder 24.

In vertically spaced relation on the lower portion 20 of the stem 14 are formed a plurality, in the embodiment shown 3, of annular, radially projecting fins 26 which taper downwardly and outwardly. The upper end of the stem 14 is provided with an enlargement 28, the purpose of which will become immediately apparent.

In order to apply the plug 10 to a tire puncture, an elongated wire needle 30 is provided having a cord 32 threaded through the eye thereof with a self-tightening loop 34 at the outer end of the cord.

The loop 34 is slipped over the reduced portion 22 of the stem 14 and tightened on this reduced portion. Then, the needle 30 is pressed upwardly through the puncture 36 in the tire 38, the cord 32 following the needle 30 through the puncture. As the enlargement 28 of the stem 14 is drawn into the puncture, the loop 34 tightens on the stem 22 and is prevented from being pulled off the stem by abutment with the enlargement 28 on the upper end of the stem. The beveled shoulder 24 permits the lower portion of the stem to work its way easily into the puncture 36 in the tire 38 and then the plug is drawn through the tire as far as possible until the head 12 seats firmly and follows the contour of the undersurface of the tire 38 surrounding the puncture portion 36. As thus disposed, the fins 26 on the lower portion 20 of the stem 14 by virtue of their downward, outward extension lock the stem portion 20 in place in the puncture 36 and effectively prohibit any inward movement of the plug stem into the tire.

Next, the major portion of the stem 14 projecting above the tire 38 is cut-off as illustrated in Figure 4 so that only about one-eighth of an inch of the lower portion 20 of the stem 14 projects above the tire. Then, heat is applied to the exteriorly projecting portion of the lower portion 20 which remains exposed and the same is melted to a semi-liquid condition whereby it can be kneaded outside of the tire forming a permanent puncture repair job.

It is highly important that the plug be of a soft, pliable rubber composition in order to prevent friction between the top of the stem of the plug and the area of the tire surrounding the puncture. In the application of the plug to the puncture in the tire casing, the process is greatly simplified by the application of liquid rubber in both the puncture and the stem of the plug as well as the needle 30. The heating operation not only fuses the top portion of the stem to the upper surface of the tire casing but serves to fuse as well the portion of the stem inside of the casing within the puncture causing a unitary cohesion of the stem with the tire itself to prevent and positively eliminate any friction which may otherwise develop between the stem and the punctured portion 36 of the tire.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A method for repairing tire punctures with a plug having a head and stem with the stem being of greater length then the thickness of the tire to be repaired, which comprises pulling the stem through the puncture until the head of the plug engages the undersurface of the tire and the stem projects outwardly beyond the top surface of the tire, then applying heat to the outwardly projecting stem to melt the same and fuse it onto the tire surface.

References Cited in the file of this patent

UNITED STATES PATENTS

| 583,436 | Hatch | May 25, 1897 |
| 787,010 | Tingley | Apr. 11, 1905 |
| 1,453,485 | Vosburgh | May 1, 1923 |
| 1,975,149 | Heintz | Oct. 2, 1934 |
| 2,075,453 | Mullen | Mar. 30, 1937 |
| 2,668,570 | Pfeifer | Feb. 9, 1954 |